(12) United States Patent
Moyer (10) Patent No.: US 10,841,190 B1
(45) Date of Patent: Nov. 17, 2020

(54) USING AN INVERSE CUMULATIVE HISTOGRAM TO EFFICIENTLY ANALYZE WEB SERVICE REQUEST LATENCIES

(71) Applicant: Zendesk, Inc., San Francisco, CA (US)

(72) Inventor: Frederick Clark Moyer, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 0 days.

(21) Appl. No.: 16/779,058

(22) Filed: Jan. 31, 2020

(51) Int. Cl.
*H04L 12/26* (2006.01)
*H04L 12/24* (2006.01)
*G06F 17/18* (2006.01)

(52) U.S. Cl.
CPC .......... *H04L 43/0817* (2013.01); *G06F 17/18* (2013.01); *H04L 41/22* (2013.01); *H04L 41/5009* (2013.01); *H04L 43/045* (2013.01); *H04L 43/0864* (2013.01); *H04L 43/0888* (2013.01); *H04L 43/16* (2013.01)

(58) Field of Classification Search
CPC ..... G06F 17/18; H04L 41/22; H04L 41/5009; H04L 43/04; H04L 43/045; H04L 43/0817; H04L 43/0864; H04L 43/0888; H04L 43/16
See application file for complete search history.

(56) References Cited

U.S. PATENT DOCUMENTS

| | | | | |
|---|---|---|---|---|
| 8,452,871 B2 * | 5/2013 | Ge | ............ | H04L 43/04 709/224 |
| 8,566,441 B2 * | 10/2013 | Agarwal | ............ | H04L 43/04 709/224 |
| 8,938,532 B2 * | 1/2015 | Terrell | ............ | H04L 41/5009 709/224 |
| 8,984,116 B2 * | 3/2015 | Ge | ............ | H04L 41/0622 709/223 |
| 9,602,377 B2 * | 3/2017 | Agarwal | ............ | H04L 43/0864 |

OTHER PUBLICATIONS

Joel Sommers et al. "Multiobjective Monitoring for SLA Compliance", IEEE/ACM Transactions on Networking, vol. 18, No. 2, Apr. 2010, 14 pages. (Year: 2010).*

Yunqi Zhang et al. "Treadmill: Attributing the Source of Tail Latency through Precise Load Testing and Statistical Inference", 2016 ACM/IEEE 43rd Annual International Symposium on Computer Architecture, 13 pages. (Year: 2016).*

* cited by examiner

*Primary Examiner* — George C Neurauter, Jr.
(74) *Attorney, Agent, or Firm* — Park, Vaughan, Fleming & Dowler LLP (57) ABSTRACT

The disclosed embodiments relate to a system that analyzes latencies for web service requests. During operation, the system receives web service requests at a web service. The system also records latency values associated with processing the web service requests in an inverse cumulative histogram, which is stored in a set of bins, wherein each bin is associated with a range of latency values between a high range value and a low range value, and wherein each bin contains a sample count for latencies that fall within the bin plus a sample count of an adjacent bin associated with a next higher range of latency values. Next, upon receiving a request to determine a number of web-service requests having latencies that are less than a target latency value, the system returns a sample count from a matching bin, which has a high range value that matches the target latency value.

27 Claims, 8 Drawing Sheets

| Duration Range | Banded Bin Inequalities | Duration Range | Cumulative Bin Inequalities / #tags | Inverse Cumulative Cumulative Bin Inequalities / #tags |
|---|---|---|---|---|
| 0-10 | gt_0_le_10 | 0-10 | le_10 .. le_inf / 40 | gt_0 / 1 |
| 10-20 | gt_10_le_20 | 0-20 | le_20 .. le_inf / 39 | gt_0 .. gt_10 / 2 |
| 20-30 | gt_20_le_30 | 0-30 | le_30 .. le_inf / 38 | gt_0 .. gt_20 / 3 |
| 30-40 | gt_30_le_40 | 0-40 | le_40 .. le_inf / 37 | gt_0 .. gt_30 / 4 |
| 40-50 | gt_40_le_50 | 0-50 | le_50 .. le_inf / 36 | gt_0 .. gt_40 / 5 |
| 50-60 | gt_50_le_60 | 0-60 | le_60 .. le_inf / 35 | gt_0 .. gt_50 / 6 |
| 60-70 | gt_60_le_70 | 0-70 | le_70 .. le_inf / 34 | gt_0 .. gt_60 / 7 |
| 70-80 | gt_70_le_80 | 0-80 | le_80 .. le_inf / 33 | gt_0 .. gt_70 / 8 |
| 80-90 | gt_80_le_90 | 0-90 | le_90 .. le_inf / 32 | gt_0 .. gt_80 / 9 |
| 90-100 | gt_90_le_100 | 0-100 | le_100 .. le_inf / 31 | gt_0 .. gt_90 / 10 |
| 100-200 | gt_100_le_200 | 0-200 | le_200 .. le_inf / 30 | gt_0 .. gt_100 / 11 |
| 200-300 | gt_200_le_300 | 0-300 | le_300 .. le_inf / 29 | gt_0 .. gt_200 / 12 |
| 300-400 | gt_300_le_400 | 0-400 | le_400 .. le_inf / 28 | gt_0 .. gt_300 / 13 |
| 400-500 | gt_400_le_500 | 0-500 | le_500 .. le_inf / 27 | gt_0 .. gt_400 / 14 |
| 500-600 | gt_500_le_600 | 0-600 | le_600 .. le_inf / 26 | gt_0 .. gt_500 / 15 |
| 600-700 | gt_600_le_700 | 0-700 | le_700 .. le_inf / 25 | gt_0 .. gt_600 / 16 |
| 700-800 | gt_700_le_800 | 0-800 | le_800 .. le_inf / 24 | gt_0 .. gt_700 / 17 |
| 800-900 | gt_800_le_900 | 0-900 | le_900 .. le_inf / 23 | gt_0 .. gt_800 / 18 |
| 900-1,000 | gt_900_le_1000 | 0-1,000 | le_1000 .. le_inf / 22 | gt_0 .. gt_900 / 19 |
| 1,000-1,500 | gt_1000_le_1500 | 0-1,500 | le_1500 .. le_inf / 21 | gt_0 .. gt_1000 / 20 |
| 1,500-2,000 | gt_1500_le_2000 | 0-2,000 | le_2000 .. le_inf / 20 | gt_0 .. gt_1500 / 21 |
| 2,000-2,500 | gt_2000_le_2500 | 0-2,500 | le_2500 .. le_inf / 19 | gt_0 .. gt_2000 / 22 |
| 2,500-3,000 | gt_2500_le_3000 | 0-3,000 | le_3000 .. le_inf / 18 | gt_0 .. gt_2500 / 23 |
| 3,000-3,500 | gt_3000_le_3500 | 0-3,500 | le_3500 .. le_inf / 17 | gt_0 .. gt_3000 / 24 |
| 3,500-4,000 | gt_3500_le_4000 | 0-4,000 | le_4000 .. le_inf / 16 | gt_0 .. gt_3500 / 25 |
| 4,000-4,500 | gt_4000_le_4500 | 0-4,500 | le_4500 .. le_inf / 15 | gt_0 .. gt_4000 / 26 |
| 4,500-5,000 | gt_4500_le_5000 | 0-5,000 | le_5000 .. le_inf / 14 | gt_0 .. gt_4500 / 27 |
| 5,000-6,000 | gt_5000_le_6000 | 0-6,000 | le_6000 .. le_inf / 13 | gt_0 .. gt_5000 / 28 |
| 6,000-7,000 | gt_6000_le_7000 | 0-7,000 | le_7000 .. le_inf / 12 | gt_0 .. gt_6000 / 29 |
| 7,000-8,000 | gt_7000_le_8000 | 0-8,000 | le_8000 .. le_inf / 11 | gt_0 .. gt_7000 / 30 |
| 8,000-9,000 | gt_8000_le_9000 | 0-9,000 | le_9000 .. le_inf / 10 | gt_0 .. gt_8000 / 31 |
| 9,000-10,000 | gt_9000_le_10000 | 0-10,000 | le_10000 .. le_inf / 9 | gt_0 .. gt_9000 / 32 |
| 10,000-15,000 | gt_10000_le_15000 | 0-15,000 | le_15000 .. le_inf / 8 | gt_0 .. gt_10000 / 33 |
| 15,000-20,000 | gt_15000_le_20000 | 0-20,000 | le_20000 .. le_inf / 7 | gt_0 .. gt_15000 / 34 |
| 20,000-25,000 | gt_20000_le_25000 | 0-25,000 | le_25000 .. le_inf / 6 | gt_0 .. gt_20000 / 35 |
| 25,000-30,000 | gt_25000_le_30000 | 0-30,000 | le_30000 .. le_inf / 5 | gt_0 .. gt_25000 / 36 |
| 30,000-40,000 | gt_30000_le_40000 | 0-40,000 | le_40000 .. le_inf / 4 | gt_0 .. gt_30000 / 37 |
| 40,000-50,000 | gt_40000_le_50000 | 0-50,000 | le_50000 .. le_inf / 3 | gt_0 .. gt_40000 / 38 |
| 50,000-60,000 | gt_50000_le_60000 | 0-60,000 | le_60000 .. le_inf / 2 | gt_0 .. gt_50000 / 39 |
| 60,000-Inf | gt_60000_lt_inf | 0-inf | lt_inf / 1 | gt_0 .. gt_60000 / 40 |

FIG. 8

USING AN INVERSE CUMULATIVE HISTOGRAM TO EFFICIENTLY ANALYZE WEB SERVICE REQUEST LATENCIES

FIELD

The disclosed embodiments generally relate to the design of performance analysis tools to support web services. More specifically, the disclosed embodiments relate to a technique for using an inverse cumulative histogram to facilitate efficient analysis of latencies for web service requests.

RELATED ART

As the Internet continues to proliferate, users are typically accessing various "web services" in order to interact with websites and associated computational resources. For example, if a user encounters a problem while using a website, the user can access a customer-support section of the website to assist in resolving the problem. This typically involves first making a request to an associated web service to create a "ticket," which is used to keep track of the user's problem. However, when such requests are not processed in a timely manner, users can become dissatisfied, and service-level agreements (SLAs) may be violated, which can be very costly to a business.

To deal with such performance issues, it is desirable to keep track of the latencies involved in processing the web-service requests. However, the number of web service requests can be extremely large, which makes it impractical to store individual latency values for each web service request. Hence, existing performance analysis tools often keep track of average latency values. This greatly reduces storage requirements, and average latency values can be used to detect major performance problems. However, such average latency values do not provide specific details about latency distributions, which can be useful in diagnosing performance problems. To remedy this deficiency, it is possible to store histograms of latency values, which keep track of latencies in specific latency ranges. However, using such histograms to answer a query such as "how many requests take less than 500 millisecond to process?" can be computationally expensive for both users and systems.

Hence, what is needed is a technique for keeping track of latencies for web-service requests without these performance issues.

SUMMARY

The disclosed embodiments relate to a system that analyzes latencies for web service requests. During operation, the system receives web service requests at a web service. The system also records latency values associated with processing the web service requests in an inverse cumulative histogram, which is stored in a set of bins, wherein each bin is associated with a range of latency values between a high range value and a low range value, and wherein each bin contains a sample count for latencies that fall within the bin plus a sample count of an adjacent bin associated with a next higher range of latency values. (Note that the phrase "processing the web service request" refers actions performed by the web service in response to receiving web service request, including actions associated with "resolving," "responding to," "completing," "acknowledging," "answering," "reacting to," and "replying to" the web service request. In one example, the phrase can refer to actions performed while resolving a customer's ticket.) Next, upon receiving a request to determine a number of web-service requests having latencies that are less than a target latency value, the system returns a sample count from a matching bin, which has a high range value that matches the target latency value.

In some embodiments, if the target latency value falls between the high range value and the low range value of an enclosing bin, the system retrieves a sample count from the enclosing bin, and uses interpolation to adjust the sample count to estimate the number of web-service requests having latencies that are less than a target latency value.

In some embodiments, recording a given latency value in the inverse cumulative histogram comprises using tags to record the fact that the given latency value falls within each bin that has a high range value, which is less than the given latency value.

In some embodiments, while processing the web service requests, the web service makes downstream web service requests to one or more downstream web services. In these embodiments, while recording latency values for received web service requests, the system additionally records latency values for the downstream web service requests to facilitate optimizing execution of the web service requests by the web service and the one or more downstream web services.

In some embodiments, the system uses the sample count to compute a service-level indicator (SLI) for the web service.

In some embodiments, the system uses the sample count to determine whether a service-level agreement (SLA) has been violated.

In some embodiments, the system uses the sample count to determine how to optimize execution of the web service requests.

In some embodiments, while monitoring the web service requests, the system monitors an event bus that communicates events associated with the web service requests.

In some embodiments, the user is a customer of a website.

In some embodiments, the user is a customer-support agent.

In some embodiments, the web service requests are associated with a customer-service ticketing system.

In some embodiments, the web service requests include one or more of the following requests, which are associated with the customer-service ticketing system: a ticket-creation request; a ticket-updating request; a request to add a user; a request to display a list of users; a request to update a user; and a request to start a chat session with a user.

BRIEF DESCRIPTION OF THE FIGURES

FIG. 8 compares a banded histogram with a cumulative histogram and an inverse cumulative histogram in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Measurements of latency values for web service requests can be gathered and stored as time-series data, wherein each time-series data point includes a timestamp and a latency value (for example, in milliseconds). However, because storage of individual data points is prohibitive for large scale systems, latency data is typically stored as aggregates instead of individual values. For example, percentiles and averages can be used to aggregate latency-based time-series data. However, this approach inherently suffers from lack of specific performance details, and the inability to be additionally aggregated across different web service entities and time ranges.

Histogram-based storage of latency avoids these issues. However, existing histogram-based solutions, such as high dynamic range (HDR) histograms and cumulative style histograms, present the challenges of either high user and system complexity or high time-series cardinality.

Figure 1A:
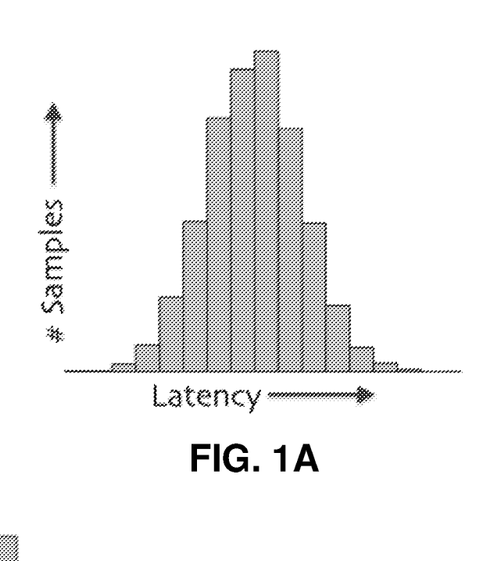
FIG. 1A illustrates a banded histogram.

For "banded" HDR histograms such as shown in FIG. 1A, wherein each bar represents the number of requests in each bin, high user and system complexity arises because to perform operations such as "count requests below 500 ms," users must specify each bin (0-10 ms, 10-20 ms, 20-30 ms, etc.) from 0 ms to 500 ms. This can impart high complexity for time-series database users, as well as for applications that must aggregate this time-series data. A banded histogram implementation can be advantageous because only one bin is needed to describe a sample. For example, counting the number of samples between 800 ms and 900 ms simply involves executing a count("gt_800_le_900") function. Moreover, latency band graphs are easily implemented with banded histogram bins. However, a banded histogram implementation has disadvantages because when calculating a service-level indicator (SLI) based on banded histogram bins, all of the bins below the SLI value need to be summed, which is computationally expensive.

Figure 1B:
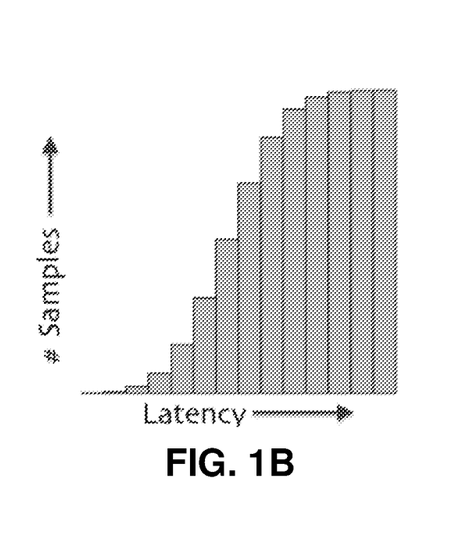
FIG. 1B illustrates a cumulative histogram.

A cumulative histogram implementation such as shown in FIG. 1B, wherein each bar represents the number of requests in each bin, is advantageous because SLIs can be calculated easily by counting the number of samples submitted with tags corresponding to the SLI. For example, if an SLI is 80,000 ms, it is possible to simply select the le_80000 tag to get the count of requests under or equal to 80,000 ms. However, a cumulative histogram implementation has disadvantages because for lower sample values more tags are required to classify the sample. For example, with a 1 ms latency sample, it is necessary to specify all bins in the histogram. This can result in a high degree of metric cardinality, whereas with a banded histogram implementation, only a fraction of the possible tags need to be specified. High metric cardinality is undesirable because of the computational complexity it places on monitoring and time-series database systems. Moreover, to find the count of samples within an individual bin, it is necessary to subtract two adjacent bins. For example, to calculate the number of samples between 900 ms and 1,000 ms, we calculate count ('le_1000')–count('le_900').

To avoid the problems of high cardinality while storing time-series latency and high user and system complexity, an inverse cumulative histogram implementation (the opposite of a cumulative histogram implementation) can be used. A visual representation of an exemplary inverse cumulative distribution appears in FIG. 1C, wherein each bar represents the number of requests in each bin.

Figure 1C:
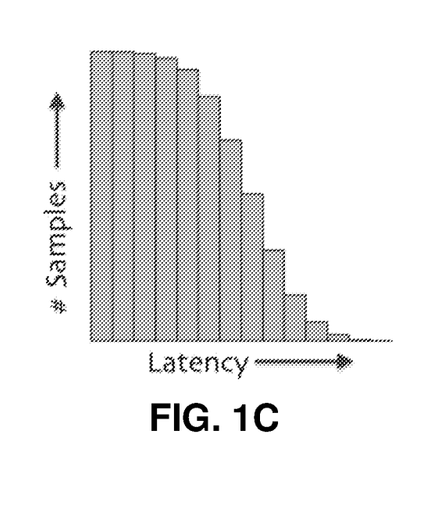
FIG. 1C illustrates an inverse cumulative histogram in accordance with the disclosed embodiments.

In an inverse cumulative implementation, performing an operation such as "count requests below 500 ms," involves simply accessing a single bin designated "greater than 500 ms," and subtracting that count from the total count of requests, as recorded in the gt_0 bin. This access to a single time-series value provides both low user and system complexity and low time-series cardinality. To record a latency value of 47 milliseconds, the following bins would be recorded as distinct time series:

gt_0, gt_10, gt_20, gt_30, gt_40.

Note that the next highest bin "gt_50" (greater than 50) would not be assigned.

If we want a count of requests that were under 50 milliseconds, we can subtract the count of requests which had values greater than 50 milliseconds (contained in the bin gt_50) from the total number of request (contained in the bin gt_0). Moreover, to obtain the total count of requests, it is possible to simply access the first bin "gt_0."

A user can define the range of bins as needed, but the first bin should be "gt_0," and the last bin should be "gt_X," wherein X is the highest desired interval. An exemplary bin distribution appears below:

gt_0
gt_100
gt_200
gt_300
gt_400
gt_500.

Note that values over 500 milliseconds can all be recorded using the "gt_500" bin, which represents values from over 500 milliseconds to infinity (or the maximum integer representation of the system). (Note that the cumulative histogram has a "le_inf" tag, whereas the inverse cumulative histogram does not, because the inverse cumulative histogram is measuring "greater thans.")

Assuming that a web service has 90% of values under 200 ms, the "gt_0" and "gt_00" tags in an inverse cumulative histogram would be recorded for 90% of those values. In contrast, for a cumulative histogram implementation, possible corresponding bins would be "le_200" (less than or equal to 200), "le_300," "le_400," "le_500," and "lt_inf" (less than infinity). This is double the bin count of the inverse cumulative approach. To provide additional details, The table in FIG. 8 compares a banded histogram with a cumulative histogram and an inverse cumulative histogram.

Before describing the system further, we first describe an exemplary computing environment in which it can operate.

Computing Environment

Figure 1D:
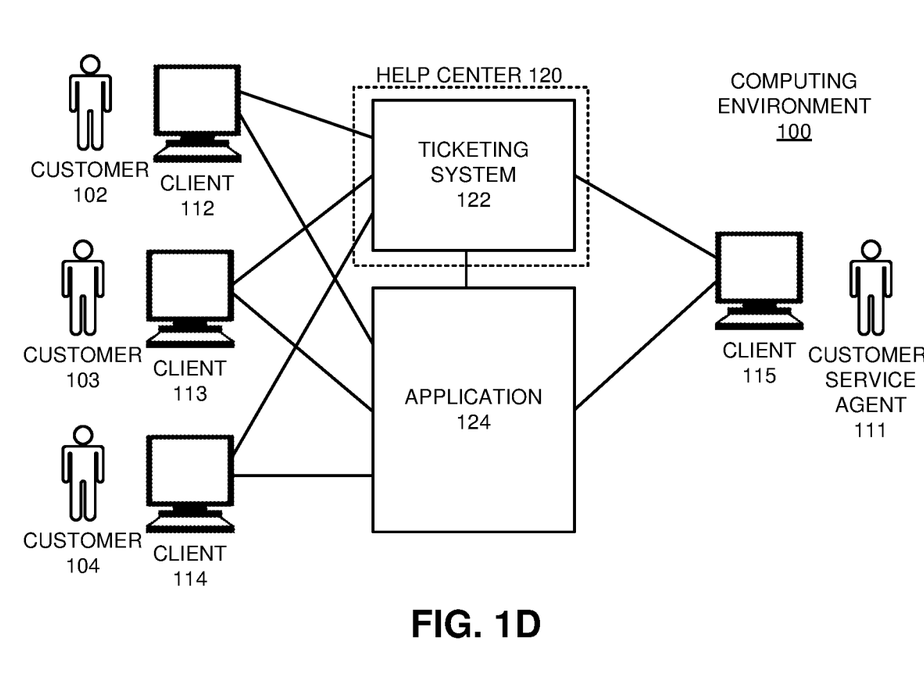
FIG. 1D illustrates a computing environment including an application and an associated ticketing system in accordance with the disclosed embodiments.

FIG. 1D illustrates an exemplary computing environment 100 in which a latency analysis system can operate, which includes a ticketing system 122. (However, note that the analysis technique can generally operate in any computing environment that includes a web service that processes web service requests.)

Computing environment 100 includes an application 124 and ticketing system 122. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about goods or services provided by the organization, or about application 124, they can access a help center 120 to obtain help dealing with issues, which can include various problems and questions. For example, a user of accounting software may need help using a feature of the accounting software, or a customer of a website that sells sporting equipment may need help cancelling an order that was erroneously entered. This help may be provided by a customer-service agent 111 who operates a client computer system 115 and interacts with customers 102-104 through help center 120. This help may also comprise automatically suggested helpful articles that the customer can read to hopefully resolve the problem or question. Note that customer-service agent 111 can access application 124 (either directly or indirectly through help center 120) to help resolve an issue.

In some embodiments, help center 120 is not associated with computer-based application 124, but is instead associated with another type of product or service that is offered to a customer. For example, help center 120 can provide assistance with a product, such as a television, or with a service such as a package-delivery service.

Help center 120 organizes customer issues using a ticketing system 122, which generates tickets to represent each customer issue. Ticketing systems are typically associated with a physical or virtual "help center" (or "help desk") for resolving customer problems. Note that, although the present invention is described with reference to a ticketing system, it is not meant to be limited to customer-service interactions involving ticketing systems. In general, the invention can be applied to any type of system that enables a customer to resolve a problem with a product or service provided by an organization.

Ticketing system 122 comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

Ticketing system 122 is described in further detail below.

Ticketing System

Figure 2:
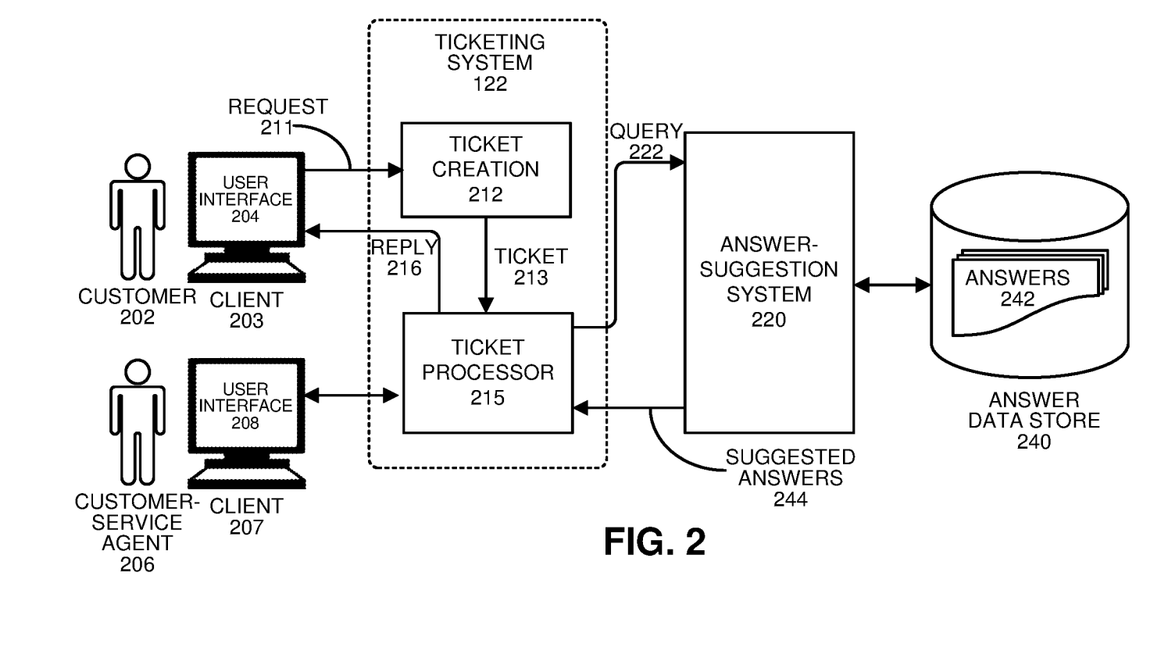
FIG. 2 illustrates various components in a ticketing system in accordance with the disclosed embodiments.

FIG. 2 illustrates a number of processes, which are associated with a ticketing system 122 and an associated answer-suggestion system 220, in accordance with the disclosed embodiments. One of the processes starts with a ticket-creation operation 212 that takes place within ticketing system 122. This ticket-creation operation 212 is triggered by actions of a customer 202 operating on a client 203 through a user interface 204 who has an issue with a product or a service, and submits a request 211 to obtain help with the issue. Note that customer 202 can submit request 211 through a number of possible channels, including through email, online forms, social networking sites, etc. In response to request 211, the ticket-creation operation 212 produces a ticket 213 that feeds into a ticket processor 215.

Next, ticket processor 215 can send a query 222, which is associated with the customer request 211 and the corresponding ticket 213, to an answer-suggestion system 220. Then, answer-suggestion system 220 obtains a set of suggested answers 244 from a set of answers 242 contained in an answer data store 240. Next, answer-suggestion system 220 returns the suggested answers 244 to ticket processor 215, which sends a reply 216 containing the suggested answers 244 to a user interface 204 to be displayed to customer 202. Note that user interface 204 can be implemented in a number of different ways for both mobile and desktop platforms. For example, user interface 204 can be incorporated into: a web page, an email, or a UI screen provided by an application.

User interface 208 enables customer-support agent 206 operating on a client 207 to perform a customer-support operation in response to the customer requests. For example, the customer-support operation can include: suggesting an agent's answer or a helpful article to a customer; creating, editing or deleting an answer or article; or configuring a chatbot to facilitate resolving the customer request.

Many of the operations performed by ticketing system 122 are controlled by an event-driven architecture, which is described in more detail below.

Event-Driven Computing System

Figure 3:
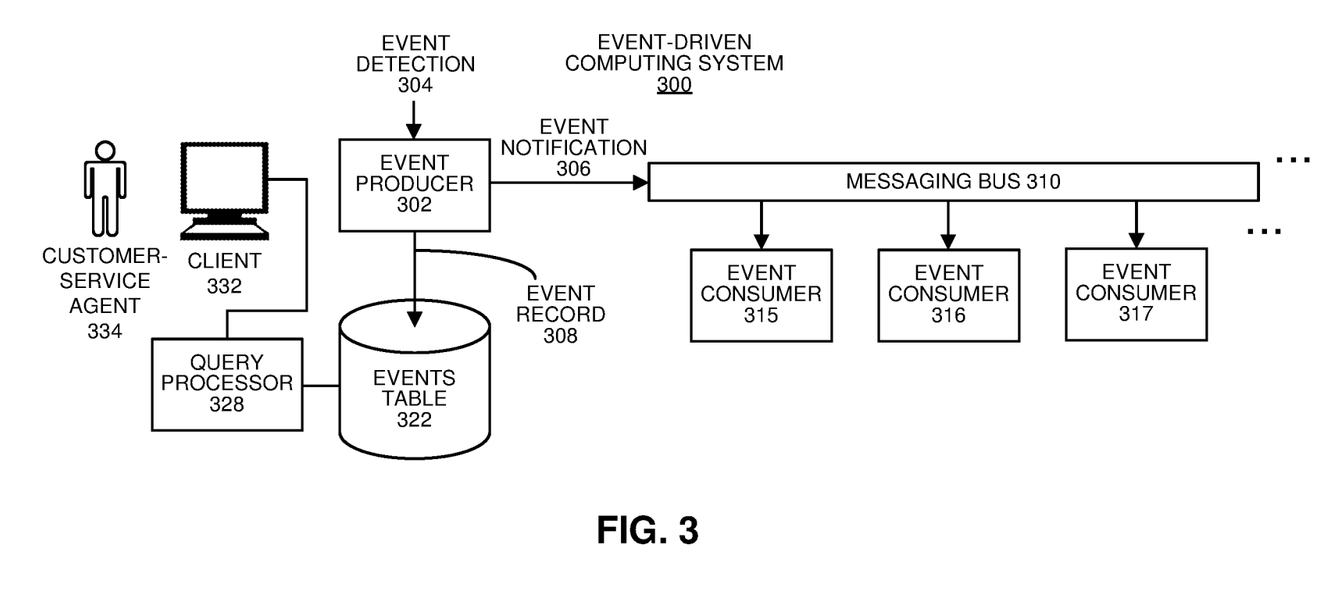
FIG. 3 illustrates an exemplary event-driven computing system in accordance with the disclosed embodiments.

FIG. 3 illustrates an exemplary event-driven computing system 300 in accordance with the disclosed embodiments. As mentioned above, an event-driven computing system includes both event producers, such as event producer 302, and event consumers 315-317. Event producers are entities, such as applications or software modules, which detect an event, and signal that the event has occurred. Event consumers 315-317 are entities that need to know the event has occurred; they may be involved in processing the event or they may simply be affected by the event. Event consumers 315-317 typically operate by monitoring a "messaging bus" or "streaming platform," such as Apache Kafka™, which carries event notifications generated by event producers. In general, the term "messaging bus" can refer to any type of streaming platform or bus that can carry event notifications, and is not limited to a specific streaming platform, such as Apache Kafka™.

As illustrated in FIG. 3, event-driven computing system 300 includes an event producer 302, which is a programming component that detects an event 304. (In general, the detected event can include any type of hardware-related or software-related occurrence, which can affect the execution of any component or system associated with event producer 302 and event consumers 315-317.) In response to the event detection 304, event producer 302 writes an event record 308, to an events table 322. Event producer 302 also writes a corresponding event notification 306 to a messaging bus 310. The published event notification subsequently propagates through messaging bus 310, which enables it to be received by event consumers 315-317.

Event-driven computing system 300 also supports query operations involving events. As illustrated in FIG. 3, a query processor 328 can perform various queries on events located in events table 322, for example to facilitate segmentation operations associated with the events. Results of these query operations can be presented to a customer-service agent 334 through a client 332.

Web Services

Figure 4:
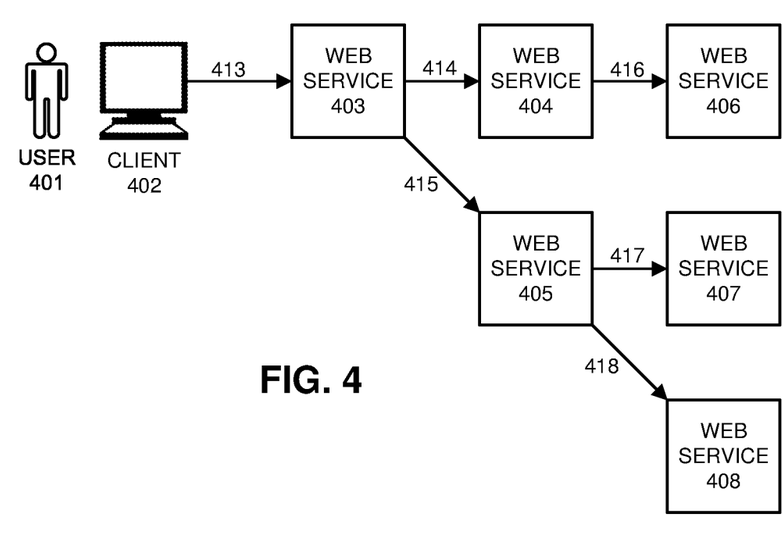
FIG. 4 illustrates how a user accesses an exemplary web service, which makes calls to various downstream web services, in accordance with the disclosed embodiments.

FIG. 4 illustrates how a user accesses an exemplary web service 403, which causes calls to be made to various downstream web services 404-408 in accordance with the disclosed embodiments. During operation, a user 401 who operates client system 402 makes a request 413 to a web service 403. For example, if the web service 403 implements a ticketing system, request 413 can be a request to create a ticket. Next, to process request 413, web service 403 makes requests 414 and 415 to downstream web services 404 and 405, respectively. Web service 404 similarly makes a request 416 to downstream web service 406, and web service 405 makes requests 417 and 418 to downstream web services 407 and 408, respectively.

The above-described latency analysis techniques can be used to analyze latencies at web service 403 and also downstream web services 404-408. This makes it possible to determine where performance bottlenecks exist. This information can be passed along to a developer who can take action to alleviate these bottlenecks, for example by optimizing loops or other code in a critical path.

Analyzing Latency Values

Figure 5:
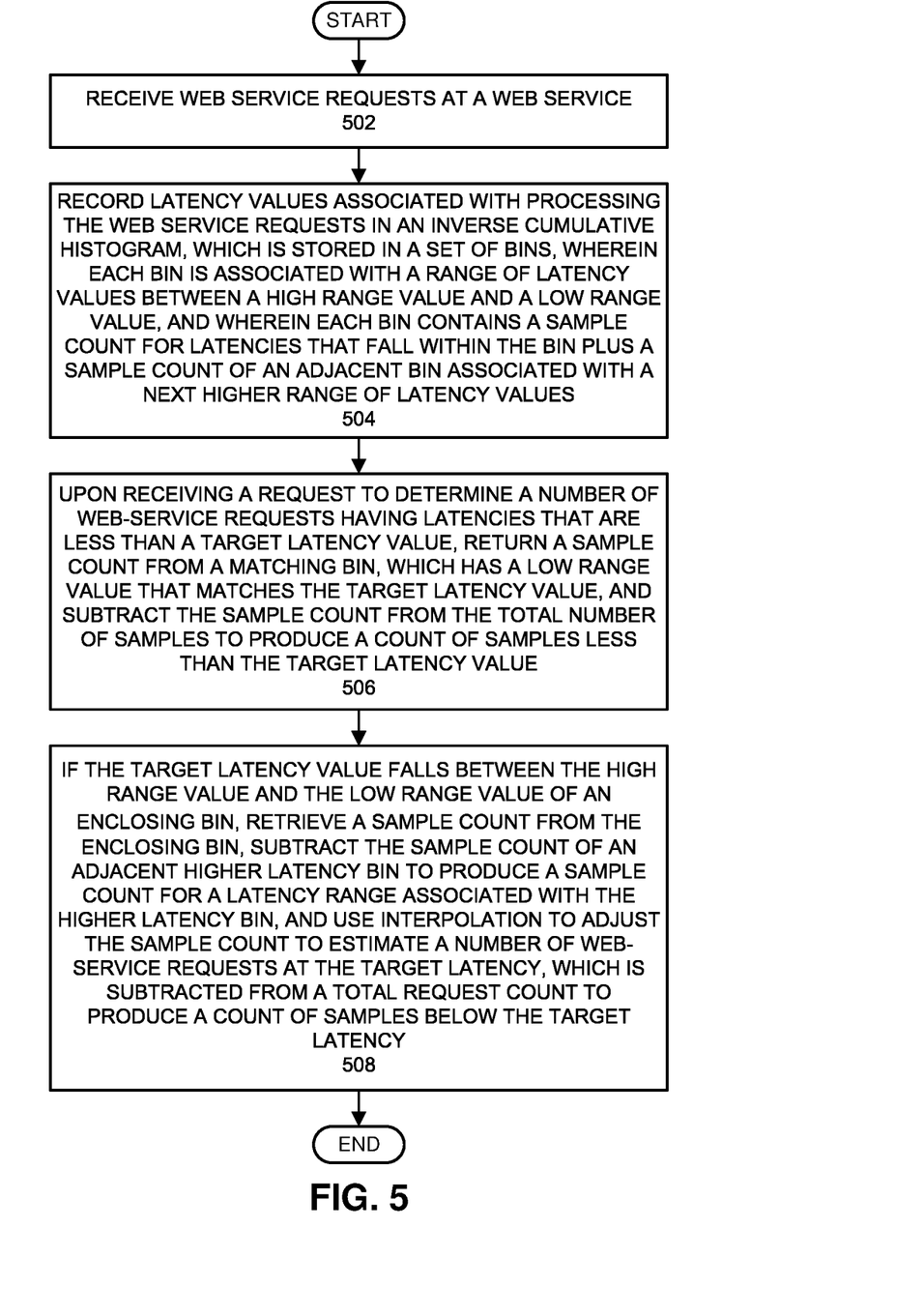
FIG. 5 presents a flow chart illustrating operations performed while analyzing latency values in accordance with the disclosed embodiments.

FIG. 5 presents a flow chart illustrating operations performed while analyzing latency values in accordance with the disclosed embodiments. During operation, the system receives web service requests at a web service (step 502). The system also records latency values associated with processing the web service requests in an inverse cumulative histogram, which is stored in a set of bins, wherein each bin is associated with a range of latency values between a high range value and a low range value, and wherein each bin contains a sample count for latencies that fall within the bin plus a sample count of an adjacent bin associated with a next higher range of latency values (step 504). Next, upon receiving a request to determine a number of web-service requests having latencies that are less than a target latency value, the system returns a sample count from a matching bin, which has a high range value that matches the target latency value (step 506). Also, if the target latency value falls between the high range value and the low range value of an enclosing bin, the system retrieves a sample count from the enclosing bin, and uses interpolation to adjust the sample count to estimate the number of web-service requests having latencies that are less than a target latency value (step 508).

Figure 6:
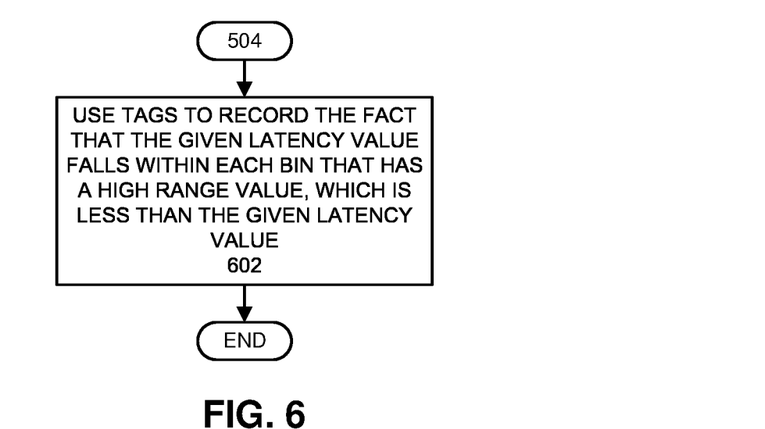
FIG. 6 presents a flow chart illustrating operations performed while recording latency values in accordance with the disclosed embodiments.

FIG. 6 presents a flow chart illustrating operations performed while recording latency values in accordance with the disclosed embodiments. During this process, the system uses tags to record the fact that the given latency value falls within each bin that has a high range value, which is less than the given latency value (step 602).

Figure 7:
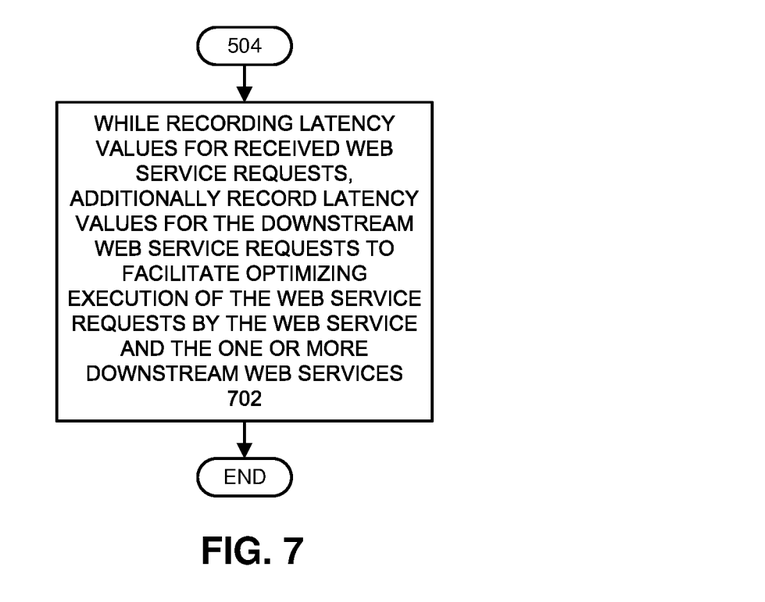
FIG. 7 presents a flow chart illustrating additional operations performed while recording latency values in accordance with the disclosed embodiments.

FIG. 7 presents a flow chart illustrating additional operations performed while recording latency values in accordance with the disclosed embodiments. As mentioned above, in some embodiments, the web service makes downstream web service requests to one or more downstream web services. For these embodiments, while recording latency values, the system additionally records latency values for the downstream web service requests to facilitate optimizing execution of the web service requests by the web service and the one or more downstream web services (step 702).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for analyzing latencies for web service requests, comprising:
   receiving web service requests at a web service;
   recording latency values associated with processing the web service requests in an inverse cumulative histogram, which is stored in a set of bins, wherein each bin is associated with a range of latency values between a high range value and a low range value, and wherein each bin contains a sample count for latencies that fall within the bin plus a sample count of an adjacent bin associated with a next higher range of latency values; and
   upon receiving a request to determine a number of web-service requests having latencies that are less than a target latency value, returning a sample count from a matching bin, which has a high range value that matches the target latency value.

2. The method of claim 1, wherein if the target latency value falls between the high range value and the low range value of an enclosing bin, retrieving a sample count from the enclosing bin, and using interpolation to adjust the sample count to estimate the number of web-service requests having latencies that are less than a target latency value.

3. The method of claim 1, wherein recording a given latency value in the inverse cumulative histogram comprises using tags to record the fact that the given latency value falls within each bin that has a high range value, which is less than the given latency value.

4. The method of claim 1,
   wherein while processing the web service requests, the web service makes downstream web service requests to one or more downstream web services; and
   wherein recording latency values for received web service requests additionally comprises recording latency values for the downstream web service requests to facilitate optimizing execution of the web service requests by the web service and the one or more downstream web services.

5. The method of claim 1, wherein the method further comprises using the sample count to compute a service-level indicator (SLI) for the web service.

6. The method of claim 1, wherein the method further comprises using the sample count to determine whether a service-level agreement (SLA) has been violated.

7. The method of claim 1, wherein the method further comprises using the sample count to determine how to optimize execution of the web service requests.

8. The method of claim 1, wherein monitoring the web service requests involves monitoring an event bus that communicates events associated with the web service requests.

9. The method of claim 1, wherein the user is a customer of a website.

10. The method of claim 1, wherein the user is a customer-support agent.

11. The method of claim 1, wherein the web service requests are associated with a customer-service ticketing system.

12. The method of claim 11, wherein the web service requests include one or more of the following requests, which are associated with the customer-service ticketing system:
   a ticket-creation request;
   a ticket-updating request;
   a request to add a user;
   a request to display a list of users;
   a request to update a user; and
   a request to start a chat session with a user.

13. A non-transitory computer-readable storage medium storing instructions that when executed by a computer cause the computer to perform a method for analyzing latencies for web service requests, the method comprising:
   receiving web service requests at a web service;
   storing latency values associated with processing the web service requests in an inverse cumulative histogram, which is stored in a set of bins, wherein each bin is associated with a range of latency values between a high range value and a low range value, and wherein each bin contains a sample count for latencies that fall within the bin plus a sample count of an adjacent bin associated with a next higher range of latency values; and
   after receiving a request to determine a number of web-service requests having latencies that are less than a target latency value,
      if a matching bin exists, which has a high range value that matches the target latency value, the method further comprises returning a sample count from the matching bin, and
      if the target latency value falls between the high range value and the low range value of an enclosing bin, the method further comprises returning a sample count from the enclosing bin, and using interpolation to adjust the sample count to estimate the number of web-service requests having latencies that are less than a target latency value.

14. The non-transitory computer-readable storage medium of claim 13, wherein recording a given latency value in the inverse cumulative histogram comprises using tags to record the fact that the given latency value falls within each bin that has a high range value, which is less than the given latency value.

15. The non-transitory computer-readable storage medium of claim 13,
   wherein while processing the web service requests, the web service makes downstream web service requests to one or more downstream web services; and
   wherein recording latency values for received web service requests additionally comprises recording latency values for the downstream web service requests to facilitate optimizing execution of the web service requests by the web service and the one or more downstream web services.

16. The non-transitory computer-readable storage medium of claim 13, wherein the method further comprises using the sample count to compute a service-level indicator (SLI) for the web service.

17. The non-transitory computer-readable storage medium of claim 13, wherein the method further comprises using the sample count to determine whether a service-level agreement (SLA) has been violated.

18. The non-transitory computer-readable storage medium of claim 13, wherein the method further comprises using the sample count to determine how to optimize execution of the web service requests.

19. The non-transitory computer-readable storage medium of claim 13, wherein monitoring the web service requests involves monitoring an event bus that communicates events associated with the web service requests.

20. The non-transitory computer-readable storage medium of claim 13, wherein the user is a customer of a website.

21. The non-transitory computer-readable storage medium of claim 13, wherein the user is a customer-support agent.

22. The non-transitory computer-readable storage medium of claim 13, wherein the web service requests are associated with a customer-service ticketing system.

23. The non-transitory computer-readable storage medium of claim 22, wherein the web service requests include one or more of the following requests, which are associated with the customer-service ticketing system:
- a ticket-creation request;
- a ticket-updating request;
- a request to add a user;
- a request to display a list of users;
- a request to update a user; and
- a request to start a chat session with a user.

24. A system that analyzes latencies for web service requests, comprising:
- at least one processor and at least one associated memory; and
- an analysis mechanism, which executes on the at least one processor, wherein during operation, the analysis mechanism:
  - receives web service requests at a web service;
  - records latency values associated with processing the web service requests in an inverse cumulative histogram, which is stored in a set of bins, wherein each bin is associated with a range of latency values between a high range value and a low range value, and wherein each bin contains a sample count for latencies that fall within the bin plus a sample count of an adjacent bin associated with a next higher range of latency values; and
  - upon receiving a request to determine a number of web-service requests having latencies that are less than a target latency value, returns a sample count from a matching bin, which has a high range value that matches the target latency value.

25. The system of claim 24, wherein if the target latency value falls between the high range value and the low range value of an enclosing bin, the analysis mechanism retrieves a sample count from the enclosing bin, and uses interpolation to adjust the sample count to estimate the number of web-service requests having latencies that are less than a target latency value.

26. The system of claim 24, wherein while recording a given latency value in the inverse cumulative histogram, the analysis mechanism uses tags to record the fact that the given latency value falls within each bin that has a high range value, which is less than the given latency value.

27. The system of claim 24,
- wherein while processing the web service requests, the web service makes downstream web service requests to one or more downstream web services; and
- wherein while recording latency values for received web service requests, the analysis mechanism additionally records latency values for the downstream web service requests to facilitate optimizing execution of the web service requests by the web service and the one or more downstream web services.

\* \* \* \* \*